(12) United States Patent
Maruoka

(10) Patent No.: US 6,565,453 B2
(45) Date of Patent: *May 20, 2003

(54) THREAD RUBBER COMPOSITION AND GOLF BALL USING THE SAME

(75) Inventor: Kiyoto Maruoka, Kobe (JP)

(73) Assignee: Sumitomo Rubber Industries, Ltd., Hyogo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/842,033

(22) Filed: Apr. 26, 2001

(65) Prior Publication Data

US 2001/0051550 A1 Dec. 13, 2001

(30) Foreign Application Priority Data

Apr. 26, 2000 (JP) .......................... 2000-125819

(51) Int. Cl.$^7$ .......................... A63B 37/06; A63B 37/00
(52) U.S. Cl. .......................... 473/357; 473/356; 473/351
(58) Field of Search .......................... 473/351, 356–366; 525/332.6, 332.7

(56) References Cited

U.S. PATENT DOCUMENTS

| | | | |
|---|---|---|---|
| 4,353,557 A | | 10/1982 | Kajita et al. |
| 4,696,475 A | * | 9/1987 | Tomita et al. .............. 473/365 |
| 5,037,104 A | * | 8/1991 | Watanabe et al. ...... 260/998.14 |
| 5,340,112 A | * | 8/1994 | Hamada et al. ........ 260/998.14 |
| 5,346,223 A | * | 9/1994 | Hamada et al. .............. 473/354 |
| 5,816,939 A | * | 10/1998 | Hamada et al. .............. 428/364 |
| 5,861,465 A | * | 1/1999 | Hamada et al. .............. 473/356 |

FOREIGN PATENT DOCUMENTS

JP     B2541272     6/1993

OTHER PUBLICATIONS

Callister, Jr. William D., Materials Science and Engineering: An Introduction 4$^{th}$ Edition., New York: John Wiley & Sons, Inc. copyright 1997, pp. 452–453.*

* cited by examiner

Primary Examiner—Paul T. Sewell
Assistant Examiner—Alvin A. Hunter
(74) Attorney, Agent, or Firm—Birch, Stewart, Kolasch & Birch, LLP

(57) ABSTRACT

A thread rubber exhibiting good impact resilience and reduced in breakage during a winding step, and a golf ball employing such thread rubber are provided. The thread rubber composition for a golf ball has 0.5–7.0 parts by weight of sulfur and 0.5–5.0 parts by weight of vulcanization accelerator blended with respect to 100 parts by weight of a rubber component including either one of polyisoprene rubber, natural rubber and polybutadiene rubber, or a mixture thereof. The rubber component has a cis-1,4 bond content of from 90.0% to 93.8%. The blended amount of the sulfur is made greater than the blended amount of the vulcanization accelerator.

11 Claims, 4 Drawing Sheets

THREAD RUBBER COMPOSITION AND GOLF BALL USING THE SAME

BACKGROUND OF THE INVENTION

1. Field of the Invention

The present invention relates to a thread rubber composition and a golf ball using the thread rubber composition.

2. Description of the Background Art

Golf balls are generally classified into two categories: thread-wound golf balls having a center wound with thread rubber as its core material which is enveloped by a cover; and solid golf balls having a core material of solid rubber which is enveloped by a cover. The thread-wound golf balls are superior in shot feeling and controllability, while the solid golf balls are superior in flight performance and durability.

The thread-wound golf balls exhibiting such favorable controllability have often been employed by advanced amateur golfers and professional golfers. However, ordinary amateur golfers are reluctant to use them because of their inferior flight performance. Thus, improvement of the flight performance (impact resilience) of the thread-wound golf balls has been a critical issue.

U.S. Pat. No. 4,353,557 discloses a conventional technique to increase the impact resilience of the thread-wound golf balls by forming a thread rubber with a rubber composition having 2–20 parts by weight of carbon black blended with respect to 100 parts by weight of natural rubber and/or cis-1,4-polyisoprene.

Japanese Patent Publication No. 5-41272 discloses another conventional technique to employ a thread rubber including isoprene-butadiene random copolymer having a cis-1,4 bond content of at least 80 wt % as a rubber component.

With these techniques, however, the thread rubber would break during a winding step, and therefore, sufficient hardness for a golf ball would not be obtained.

When the thread rubber is wound around the center during the manufacturing process of a golf ball, it is generally elongated by 800 to 1100%. If the thread rubber breaks at this time, productivity will be degraded considerably. Thus, prescribed elongation percentage and strength are required for the thread rubber. Further, when the thread rubber is elongated, a prescribed tensile resilience is required so as to keep sufficient hardness for the golf ball. When the thread rubber is elongated, rubber molecules come to be orientated uniformly in the elongated direction, so that crystallization takes place. As a result, rubber elasticity is lost, thereby decreasing the impact resilience of the golf ball. Such decrease of the impact resilience should be suppressed.

SUMMARY OF THE INVENTION

The present invention is directed to solve the above-described problems. An object of the present invention is to provide a thread rubber exhibiting good impact resilience and reduced in breakage during a winding step, and a golf ball employing such a thread rubber.

According to an aspect of the present invention, a thread rubber composition for a golf ball has 0.5–0.7 parts by weight of sulfur and 0.5–5.0 parts by weight of vulcanization accelerator blended with respect to 100 parts by weight of a rubber component that is formed of either one of polyisoprene rubber, natural rubber and polybutadiene rubber, or a mixture thereof. The rubber component has a cis-1,4 bond content of from 90.0% to 93.8%, and the blended amount of sulfur is made greater than the blended amount of vulcanization accelerator. The rubber component preferably has a trans-1,4 bond content in a range between 2.0% and 5.0%.

According to another aspect of the present invention, a thread rubber is obtained by shaping the above-described thread rubber composition into a sheet through an extrusion step and a calendering step, vulcanizing the sheet to obtain a vulcanized sheet, and cutting the vulcanized sheet into threads.

According to a further aspect of the present invention, a golf ball is obtained by winding a thread rubber around a center and enveloping the center with a cover. The thread rubber is obtained by shaping the above-described thread rubber composition into a sheet, vulcanizing the sheet, and cutting the vulcanized sheet into threads.

Preferably, the sheet of the thread rubber composition has a ratio (t/T) of a thickness (t) of thin sheet material after the calendering step with respect to a thickness (T) of sheet after the extrusion step of from 0.03 to 0.5. Still preferably, the thickness of the thin sheet material after the calendering step is 0.5±0.1 mm with a standard deviation $\sigma$ of not greater than 0.02.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
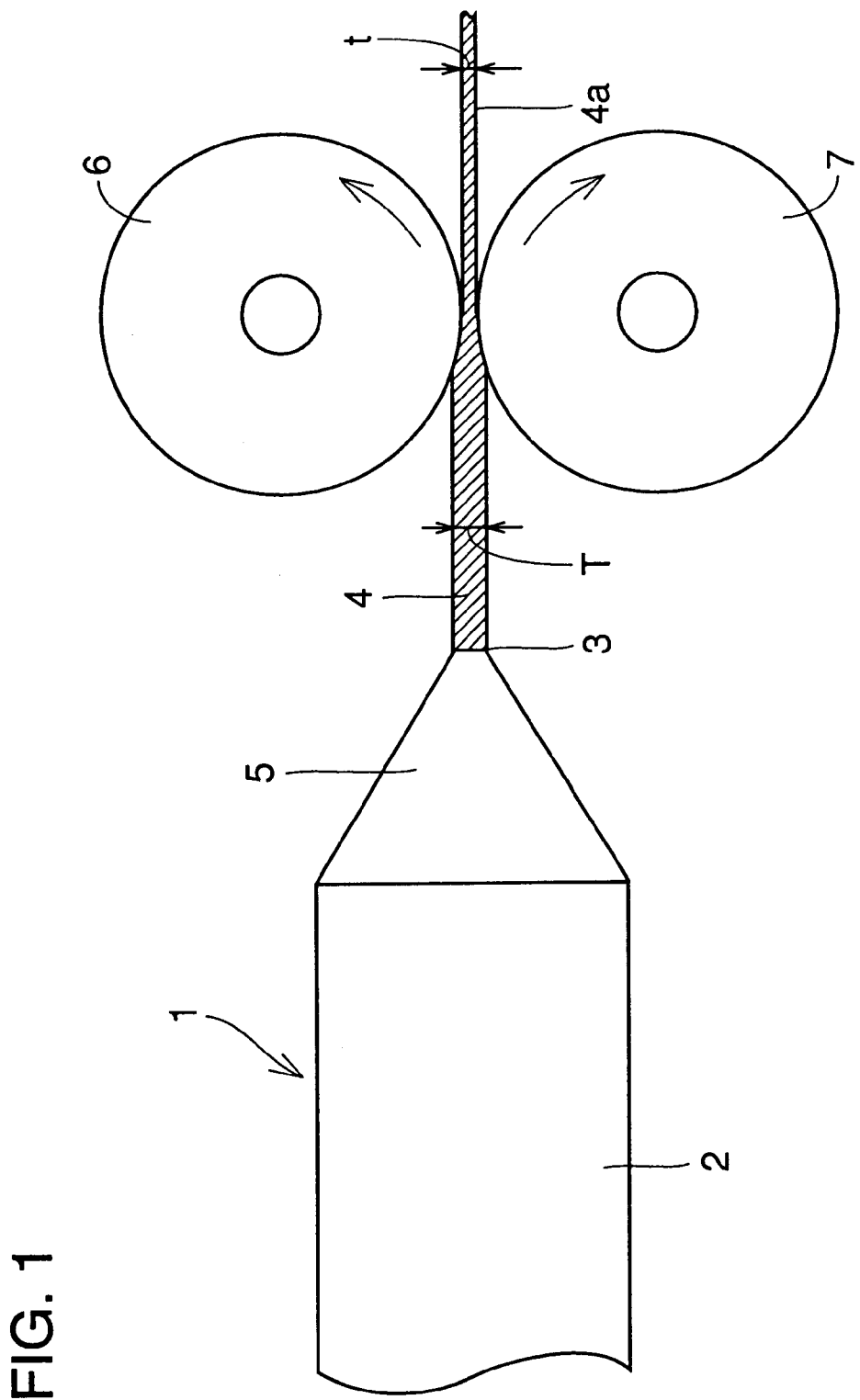
FIGS. 1 and 2 schematically illustrate an extrusion step in manufacture of a thread rubber.

A rubber component for use in the thread rubber composition according to the present invention consists of either one of polyisoprene rubber, natural rubber and polybutadiene rubber, or a mixture thereof. The rubber component has a cis-1,4 bond content in a range from 90.0% to 93.8%. In the case of the mixture of rubber components, the cis-1,4 bond content is obtained as an average of the cis-1,4 bond contents in the respective rubber components that is weighted according to their blended amounts. For example, with a mixture of 80 parts by weight of rubber component having the cis-1,4 bond content of 92% and 20 parts by weight of rubber component having the cis-1,4 bond content of 95%, the weighted average thereof is calculated as follows.

The cis-1,4 bond content of the rubber components=92×0.8+95×0.2=92.6

If the cis-1,4 bond content of the rubber component is less than 90.0%, the decrease in impact resilience in the elongated state is small. However, this rubber component has poor impact resilience in its original, not-elongated state, so that a golf ball excellent in flight performance cannot be obtained. If the cis-1,4 bond content of the rubber component exceeds 93.8%, crystallization will occur when it is elongated, due to orientation of rubber molecules in the elongated direction, so that the rubber elasticity will considerably be degraded. The cis-1,4 bond content is preferably in a range between 90.0% and 93.0%.

The trans-1,4 bond content in the rubber component is in a range from 2.0% to 5.0%. The trans-1,4 bond originally has a steric structure having high crystallinity, which will not be affected by elongation of the thread rubber. Thus, the degradation of rubber elasticity is not expected. However, if the trans-1,4 bond is included in a molecule, it will adversely affect the impact resilience. Accordingly, the trans-1,4 bond content is preferably in a range between 2.0% and 5.0%, and more preferably in a range between 2.5% and 4.0%.

Here, the cis-1,4 bond content and the trans-1,4 bond content are determined employing a nuclear magnetic resonance (NMR) device, by quantitative analysis with a known method.

The vulcanization accelerator for use in the present invention is not limited to a specific type. Those of thiuram type, guanidine type, thiazole type and sufenamide type, conventionally utilized for thread rubber compositions for golf balls, can be employed. The blended amount of the vulcanization accelerator is preferably 0.5–5.0 parts by weight, and more preferably 0.8–2.0 parts by weight. If it is less than 0.5 parts by weight, sufficient modulus for the thread rubber cannot be obtained, and therefore, when used for a golf ball, high impact resilience cannot be expected. If it exceeds 5.0 parts by weight, the modulus of the thread rubber will become too high. This decreases elongation, thereby making it difficult to tightly wind the thread rubber around the center of the golf ball.

In the thread rubber composition of the present invention, sulfur is blended 0.5–7.0 parts by weight with respect to 100 parts by weight of the rubber composition. If the blended amount of sulfur is less than 0.5 parts by weight, vulcanized density of the thread rubber becomes small, and favorable fundamental characteristics such as tensile strength, modulus and others cannot be expected. If it exceeds 7.0 parts by weight, the modulus of the thread rubber becomes too high, and sufficient elongation cannot be obtained.

Here, the blended amount of sulfur is made greater than the blended amount of vulcanization accelerator. Assume that the rubber molecules are crosslinked by means of sulfur. If the blended amount of sulfur is made large and the blended amount of the vulcanization accelerator is made small, crosslinks will be formed by polysulfide bonds. If the blended amount of sulfur is made small and that of the vulcanization accelerator is made large, crosslinks will be formed by monosulfide bonds. Here, the crosslinks formed by the polysulfide bonds are preferable in order to improve the impact resilience. Accordingly, the ratio of these blended amounts (vulcanization accelerator/sulfur) is made less than 1.0, preferably more than 0.4 and less than 1.0.

Besides the ingredients as described above, the following ingredients are blended in the thread rubber used in the present invention where appropriate: stearic acid, reinforcing agents such as carbon black, white carbon and precipitated calcium carbonate, fillers such as calcium carbonate and diatomite, plasticizers such as dioctyl phthalate and tricresyl phosphate, colorants, slip additives, specific gravity adjusting agents, and antioxidants.

The thread rubber of the present invention is obtained through kneading, extruding and calendering steps of a rubber composition, and vulcanizing and cutting steps of the obtained rubber sheet.

First, in the kneading step, vulcanizing agents, additives and others are added to a base rubber component, which is kneaded to obtain a rubber composition. For this kneading step, closed type kneading apparatuses such as kneader and Banbury mixer, open rolls and others may be utilized.

Next, in the extruding step, the rubber composition obtained in the kneading step is introduced into a cylinder 2 of an extruder 1 shown in FIG. 1, and extruded from a discharge opening 3 located in the head portion to form a sheet material 4. As the extruder is employed, the sheet material with even thickness can be obtained. As the extruder, a screw type uniaxial extruder is preferably employed, which suppresses orientation of rubber molecules, so that the extruded sheet material 4 suffers less contraction, thereby preventing irregularities in thickness thereof. The rotation speed of the screw of such a screw type uniaxial extruder is generally set from 1 rpm to 60 rpm.

The internal temperature of cylinder 2 is preferably from 50° C. to 100° C., and more preferably from 60° C. to 70° C. As the internal temperature of cylinder 2 is kept within the range, surface irregularities of sheet material 4 are alleviated, and rubber burning is prevented. The internal temperature of the head portion 5 is preferably from 80° C. to 110° C. Keeping the internal temperature of head portion 5 also allows alleviation of irregularities of the surface of sheet material 4 and prevention of the rubber burning. Further, a mesh is preferably placed inside the cylinder 2 so as to remove foreign particles within the rubber composition. Although a finer mesh would be advantageous in removing the foreign particles, too fine a mesh will prevent the rubber composition from passing therethrough, and thus, heat will be generated, causing rubber burning. Accordingly, a mesh from #60 to #120 is preferable.

The thickness T of sheet material 4 extruded from discharge opening 3 is from 1 mm to 8 mm, and preferably from 2 mm to 6 mm. If thickness T is less than 1 mm, extrusion thereof becomes difficult, thereby causing rubber burning due to heat generation of the rubber composition. If thickness T exceeds 8 mm, it becomes necessary to considerably thin the sheet material in the subsequent rolling step. This may cause unevenness in thickness of the thin sheet material.

Sheet material 4 obtained in the extruding step is passed to a calendering step employing a pair of upper roll 6 and lower roll 7. Upper roll 6 and lower roll 7 rotate in the opposite directions from each other, as shown by arrows in FIG. 1. Sheet material 4 is subjected to the rolling process while being passed between upper roll 6 and lower roll 7, so that a thin sheet 4a is obtained. Here, the extruding step and the calendering step are performed continuously. Therefore, the temperature of sheet material 4 obtained in the extruding step is kept while the rolling process is conducted, so that it becomes unnecessary to heat the sheet material 4 before the rolling process. A temporary storing space for sheet material 4 also becomes unnecessary. The temperatures of upper roll 6 and lower roll 7 in the calendering step is preferably made approximately equal to the temperature of head portion 5 of the extruder in the extruding step.

The thickness t of thin sheet material 4a obtained in the calendering step is preferably from 0.3 mm to 0.6 mm, and more preferably from 0.45 mm to 0.55 mm. If the thickness t is less than 0.3 mm, the thread rubber is likely to break as it is being wound around the center to form the core material in the golf ball manufacturing process. If it exceeds 0.6 mm, it becomes difficult to elongate the thread rubber when winding it around the center, thereby causing an insufficient winding density of the thread rubber in the core material. The golf ball having a core material whose thread rubber winding density is small is insufficient in hardness, so that the coefficient of restitution thereof becomes small. The thickness t of thin sheet material 4a is approximately equal to the thickness of the thread rubber obtained by vulcanization.

In particular, the thickness of thin sheet material 4a of 0.5±0.1 mm with a standard deviation σ of not greater than 0.02 is preferable. If the standard deviation σ exceeds 0.02, the thread rubber tends to break when being wound to form the core material.

A ratio (t/T) of thickness t of thin sheet material 4a obtained in the calendering step with respect to thickness T of sheet material 4 obtained in the extruding step is preferably from 0.03 to 0.5, and more preferably at least 0.05 and not greater than 0.3. If the value of t/T is less than 0.03, a large volume of rubber composition tends to accumulate at an inlet for upper roll 6 and lower roll 7. This will cause irregularities in thickness of thin sheet 4a in its width direction. If the value of t/T exceeds 0.5, the amount of rubber being supplied to upper roll 6 and lower roll 7 becomes insufficient. This will cause inconvenience that thin sheet material 4a will become uneven in thickness, and even split off partially.

Figure 2:
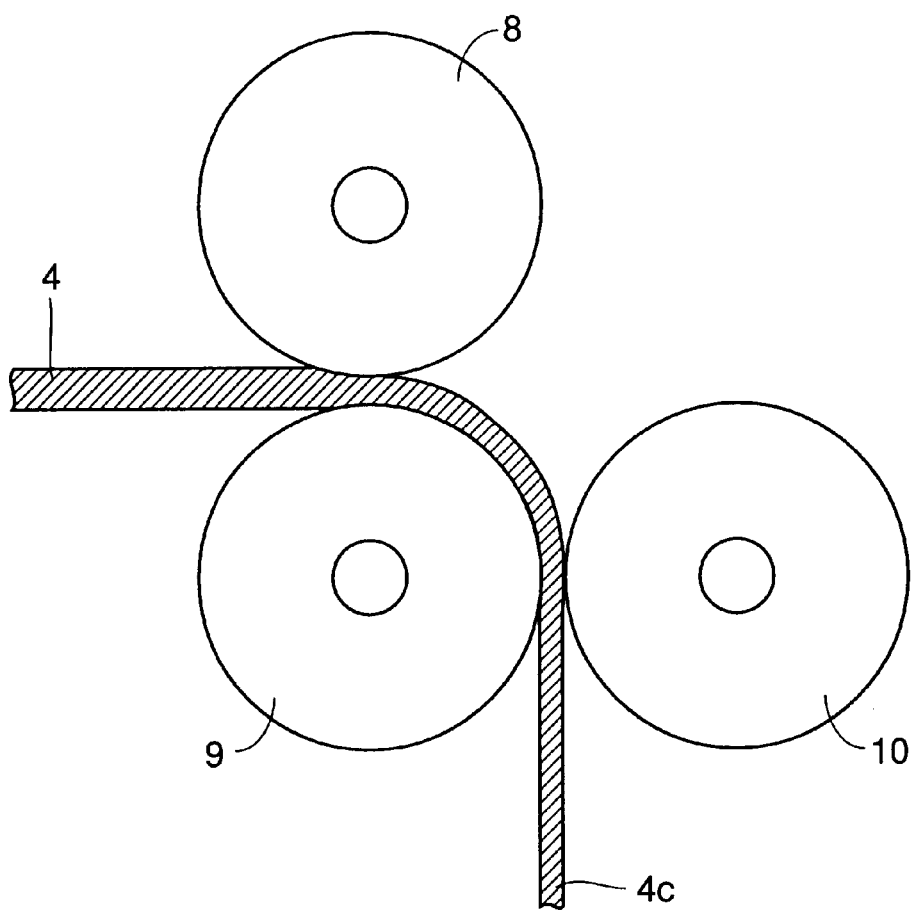

The calendering step may be performed using a pair of rolls 6, 7 as shown in FIG. 1. Alternatively, the structure including a first roll 8, a second roll 9 and a third roll 10 as shown in FIG. 2 may be employed. In this case, a more uniform thin sheet can be obtained.

Thin sheet material 4a, 4c obtained in the calendering step then undergoes the vulcanizing step. It is vulcanized by known vulcanizing means, such as a vulcanizer, and a vulcanized sheet is obtained. This vulcanized sheet is cut into a prescribed width, so that the thread rubber is obtained.

Figure 3:
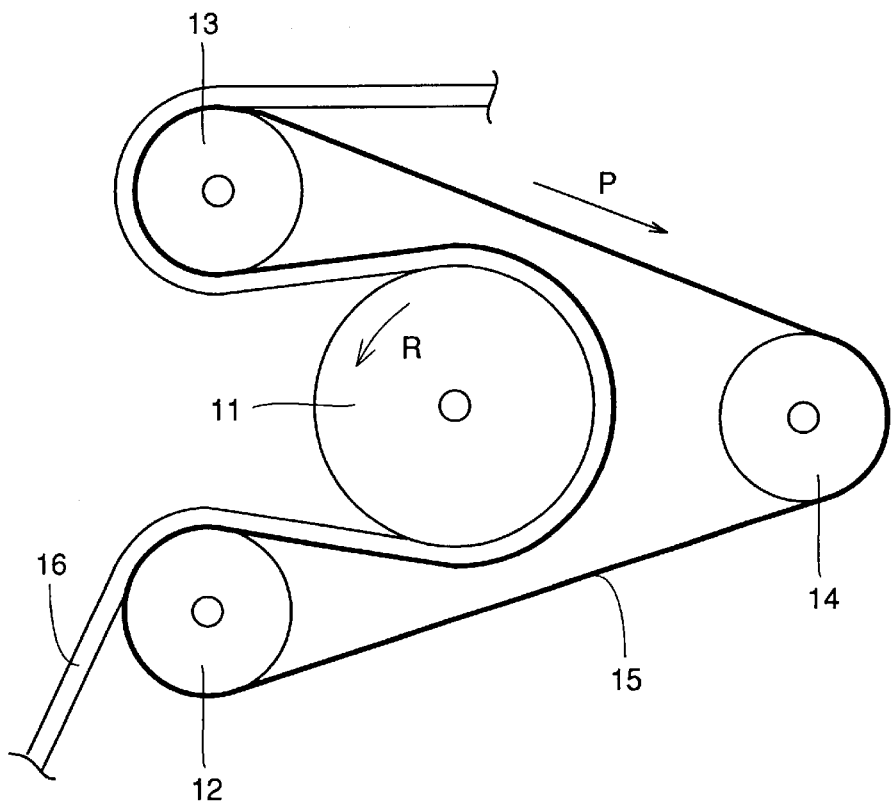
FIG. 3 schematically illustrates a vulcanizing step in manufacture of the thread rubber.

In the present invention, continuous vulcanization may be utilized instead of the vulcanizing method as described above. FIG. 3 is a schematic diagram showing a continuous vulcanizing device for use in the vulcanizing step. This continuous vulcanizing device includes a heating roller 11, first, second and third auxiliary rollers 12, 13 and 14, and a belt 15. Heating roller 11 rotates in a direction shown by an arrow R. Belt 15 is an endless belt, which is welded by pressure to heating roller 11 at a constant pressure. Belt 15 rotates in a direction shown by an arrow P, in synchronization with the rotation of heating roller 11. Examples of such continuous vulcanizing devices are the rote-cure type device available from Adamson Corporation in the USA, and the AUMA rotary press available from Berstorff in Germany.

In the continuous vulcanizing device, the rubber composition 16 in a sheet form is first provided on belt 15 in the proximity of first auxiliary roller 12. With the movement of belt 15 in the P direction, rubber composition 16 is brought to contact heating roller 11. Rubber composition 16 moves forward in the state being interposed between this heating roller 11 and belt 15. While rubber composition 16 is directly contacting heating roller 11, heat is transmitted from heating roller 11 to rubber composition 16. This causes vulcanization reaction, so that a vulcanized sheet material is obtained. The rotation speed of heating roller 11 is adjusted so as to adjust the time of vulcanization, or, the time during which rubber composition 16 is kept to directly contact heating roller 11. Thereafter, the vulcanized sheet material is detached from heating roller 11, brought to the proximity of second auxiliary roller 13, and then detached from belt 15.

Pressure is applied to rubber composition 16 while being interposed between heating roller 11 and belt 15. This pressure serves to reduce the surface roughness of the vulcanized sheet material. The pressure being applied is preferably from 0.03 MPa to 1 MPa, and more preferably from 0.1 MPa to 0.3 MPa. If the pressure is less than 0.03 MPa, the effect to reduce the surface roughness of the vulcanized sheet material will be insufficient. If the pressure exceeds 1 MPa, the modulus of the thread rubber will become too high. The pressure can be adjusted by adjusting the position relationship of heating roller 11 and first, second and third auxiliary rollers 12, 13 and 14, or by adjusting the rotation speeds of first and second auxiliary rollers 12 and 13.

As the belt 15, a metal belt, a rubber belt reinforced by fabric or metallic wire, a felt belt and others may be used. To reduce the surface roughness of the sheet material, the surface roughness of belt 15 is preferably made small.

The temperature at vulcanization in the continuous vulcanizing device is preferably between 140° C. and 160° C. If it is less than 140° C., vulcanization will take a long time, thereby degrading productivity. If it exceeds 160° C., the sheet will be overcured, and the fundamental characteristics of the thread rubber will be deteriorated. Vulcanization by the continuous vulcanizing device usually takes 3 to 20 minutes.

With the continuous vulcanizing device, the sheet rubber composition is vulcanized while it is kept in direct contact with the heating roller. Thus, variation in the degree of vulcanization due to differences in heat conduction between an inner side and an outer side occurring in the conventional case where an uncrosslinked rubber sheet is wound around a roller and subjected to vulcanization in a vulcanizer, is prevented.

EXAMPLES (1) Preparation of Thread Rubber Composition

A variable of natural rubber (pale crepe), a variable of polyisoprene rubber (brand name: IR 309; available from Shell Company), 3 parts by weight of sulfur, a variable of vulcanization accelerator (Noccelar D, Noccelar CZ, Noclac 200; all available from Ouchishinko Chemical Industrial Co., Ltd.), and a fixed amount of zinc oxide (Zinc Oxide #1; available from Sakai Chemical Co., Ltd.) were introduced into a kneader and kneaded to obtain a rubber composition. Specific ingredients of Examples and Comparative examples are shown in Table 1.

(2) Production of Thread Rubber

The following two producing methods A and B were employed to produce the thread rubber.

Production Method A

The rubber composition was shaped into a ribbon, which was introduced into a cylinder of a roller head extruder. The rubber composition was extruded from the head portion provided with a cap having a thickness of 4 mm and a width of 200 mm. The rubber composition extruded was subjected to a calendering step to obtain a sheet material of a width of 300 mm and a length of 30 m. The temperature inside the cylinder was set to 70° C., and the temperature at the head portion was set to 90° C. The rotation speed of the screw was set to 20 rpm. The sheet material had a thickness of 4 mm. The temperature of the rollers in the calendering step was set to 90° C.

Next, the thin sheet material was introduced into a vulcanizer, and subjected to steam vulcanization at 130° C. for 150 minutes to obtain a vulcanized sheet material. The sheet material obtained was cut into a width of 2 mm to obtain vulcanized thread rubber.

Production Method B

The rubber composition was shaped into a ribbon, which was introduced into a cylinder of a roller head extruder. The rubber composition was extruded from the head portion provided with a cap having a thickness of 4 mm and a width of 200 mm, and a sheet material of a width of 300 mm, a length of 30 m and a thickness adjusted to an appropriate value was obtained. The temperature within the cylinder was set to 70° C., and the temperature at the head portion was set to 90° C. The temperature of the rollers was also set to 90° C. The rotation speed of the screw was set to 20 rpm.

The sheet rubber composition thus obtained was subjected to continuous vulcanization using a continuous vulcanizing device as shown in FIG. 3 (the rote-cure type device of Adamson Corporation). The vulcanization was conducted at 150° C. for 5 minutes, applying a pressure of 0.2 MPa. The vulcanized sheet material was cut into a width of 2 mm to obtain vulcanized thread rubber.

(3) Fabrication of Center 100 parts by weight of polybutadiene rubber (BR 01; available from JSR), 5 parts by weight of zinc oxide (Zinc Oxide #1; available from Sakai Chemical Co., Ltd.), 25 parts by weight of barium sulphate, 0.2 parts by weight of vulcanization accelerator (Noccelar CZ; available from Ouchishinko Chemical Industrial Co., Ltd.) and 9 parts by weight of sulfur were kneaded and vulcanized at 150° C. for 30 minutes. A center having a diameter of 32 mm was thus obtained.

(4) Fabrication of Thread-Wound Core

The thread rubber obtained by (2) above was elongated by 1000% and wound around the center obtained by (3) above to obtain a thread-wound core.

(5) Envelopment with Cover

The thread-wound core above was enveloped by two half-shells, and heat and pressure were applied to obtain a golf ball.

Physical properties of the thread rubber sheet material obtained by the above-described methods were evaluated in the following manners.

(1) Measurement of Thickness of Thread Rubber Sheet Material

Figure 4:
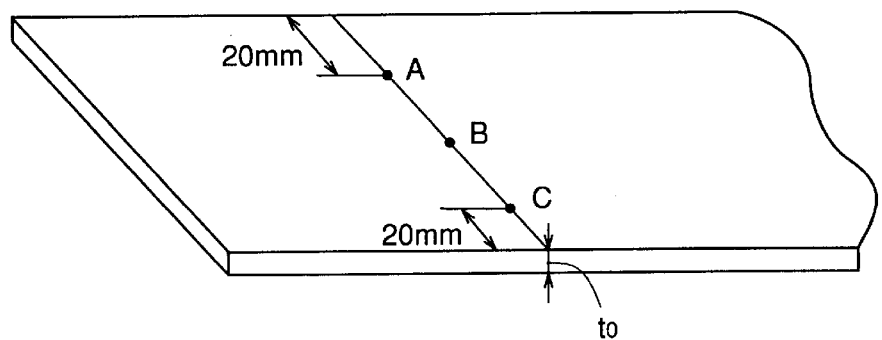
FIG. 4 schematically shows a thread rubber sheet.

As shown in FIG. 4, the thickness (t0) of the thread rubber sheet material was measured at three points A, B and C. The points A and C were taken each at the position 20 mm inwards from a respective end portion in the width direction of the sheet, and the point B was taken at the center in the width direction. The measurements at points A, B and C were repeated 30 times each at distances of 1 m in the length direction of the thread rubber sheet material. Using thus obtained measurements at 90 positions, an average thickness and its standard deviation a were calculated, which are shown in Table 1.

(2) Measurement of Number of Thread Breakage

A winding machine was used to elongate the thread rubber produced above by applying a load of 7.84 N and to wind the elongated thread rubber around a center to obtain a core material. While manufacturing 100 core materials, the number of core materials that suffered thread breakage on the way was counted.

(3) Measurement of Deformation by Compression of Core Material

A load of 980N was applied to the core material obtained above, and deformation thereof was measured. The measurement was conducted for 10 core materials, and an average value thereof is shown in Table 1.

(4) Measurement of Coefficient of Restitution of Core Material

The core material obtained above was hit by a hollow circular cylinder of aluminum having a mass of 200 g at a speed of 40 m/s. The coefficient of restitution of the core material was calculated according to the momentum conservation law. The measurement was conducted for 10 core materials, and an average value thereof is shown in Table 1.

TABLE 1

|  | Comparative examples | | | Examples | | | | | |
| --- | --- | --- | --- | --- | --- | --- | --- | --- | --- |
|  | 1 | 2 | 3 | 1 | 2 | 3 | 4 | 5 | 6 |
| Thread rubber manufacturing method | A | A | A | A | A | A | A | A | B |
| Ingredients | | | | | | | | | |
| Polyisoprene (IR 309)*1) | 70 | 50 | 90 | 75 | 90 | 90 | 90 | 100 | 90 |
| NR (pale crepe)*2) | 30 | 50 | 10 | 25 | 10 | 10 | 10 |  | 10 |
| Zinc Oxide #1 | 1 | 1 | 1 | 1 | 1 | 1 | 1 | 1 | 1 |
| Noclac 200 | 1 | 1 | 1 | 1 | 1 | 1 | 1 | 1 | 1 |
| Noccelar D | 1 | 1 | 1 | 1 | 1 | 1 | 1 | 1 | 1 |
| Noccelar CZ | 0.5 | 0.5 | 2 | 0.5 | 0.5 | 0.5 | 0.5 | 0.5 | 0.5 |
| Sulfur | 3 | 3 | 1 | 3 | 3 | 3 | 3 | 3 | 3 |
| Cis 1,4 bond content | 93.86 | 95.1 | 92.62 | 93.55 |  | 92.62 |  | 92.00 | 92.62 |
| Trans 1,4 bond content | 2.1 | 1.5 | 2.7 | 2.25 |  | 2.7 |  | 3.00 | 2.7 |
| Thickness of thread rubber sheet (mm) | 0.5 | 0.5 | 0.5 | 0.5 | 0.42 | 0.5 | 0.57 | 0.5 | 0.5 |
| Standard deviation ($\sigma$) | 0.012 | 0.014 | 0.014 | 0.013 | 0.011 | 0.012 | 0.014 | 0.012 | 0.033 |
| Evaluation | | | | | | | | | |
| Number of thread breakage | 0 | 0 | 0 | 0 | 3 | 0 | 0 | 5 | 30 |
| Coefficient of restitution | 0.7901 | 0.7832 | 0.7829 | 0.8024 | 0.8247 | 0.8106 | 0.8011 | 0.8258 | 0.8100 |
| Deformation by compression (mm) | 2.81 | 2.80 | 2.80 | 2.86 | 2.64 | 2.91 | 3.05 | 2.94 | 2.92 |

*1)Polyisoprene rubber cis 1,4 bond content: 92%, trans 1,4 bond content: 3%
*2)Natural rubber cis 1,4 bond content: 98.2%, trans 1,4 bond content: 0%

From the results in Table 1, it is found that Examples 1, 3, 5 and 6 have deformation by compression from 2.86 to 2.94 that is approximately at the same level as in Comparative examples 1–3, but they exhibit considerably increased coefficients of restitution compared to Comparative examples 1–3.

Figure 5:
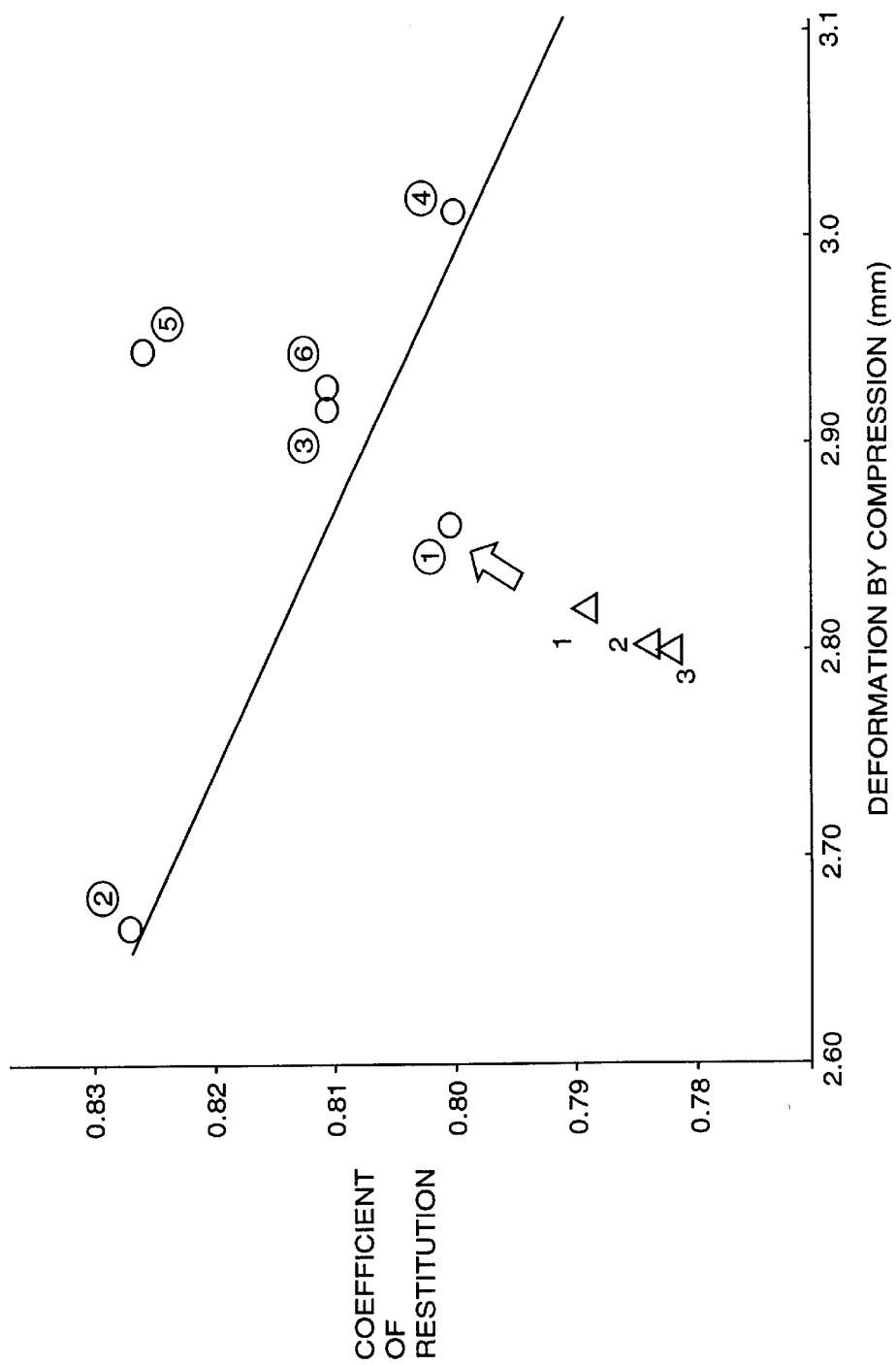
FIG. 5 shows a relation between impact resilience and deformation by compression.

FIG. 5 shows a relation between the coefficient of restitution and the deformation by compression. The coefficient of restitution should be compared at the same hardness. Therefore, the graph of FIG. 5 shows that, the more the point shifts to the upper right side of the drawing, the superior the coefficient of restitution becomes.

As explained above, according to the present invention, the cis 1,4 bond content in the rubber component such as polyisoprene rubber is set within a prescribed range, and the blended amount of sulfur is made greater than the blended amount of vulcanization accelerator. Accordingly, the decrease of rubber elasticity of the thread rubber due to elongation when being wound around the center is suppressed, and therefore, a golf ball with high impact resilience can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thread rubber composition for a golf ball, which comprises:

0.5–7.0 parts by weight of sulfur; and 0.5–5.0 parts by weight of vulcanization accelerator, the sulfur and the vulcanization accelerator being blended with respect to 100 parts by weight of a rubber component formed of one of polyisoprene rubber, natural rubber, polybutadiene rubber or a mixture thereof, wherein said rubber component has a cis-1,4 bond content of from 90.0% to 93.8%, and said rubber component has a trans-1,4 bond content of from 2.0% to 5.0%, and the blended amount of said sulfur is made greater than the blended amount of said vulcanization accelerator.

2. The thread rubber composition for a golf ball according to claim 1, wherein a ratio of the vulcanization accelerator to the sulfur is less than 1.0.

3. The thread rubber composition for a golf ball according to claim 1, wherein a ratio of the vulcanization accelerator to the sulfur is more than 0.4 and less than 1.0.

4. A thread rubber for a golf ball, produced by shaping a thread rubber composition into a sheet through an extrusion step and a calendering step, vulcanizing the sheet to obtain a vulcanized sheet, and cutting the vulcanized sheet into threads, wherein said thread rubber composition has 0.5–7.0 parts by weight of sulfur and 0.5–5.0 parts by weight of vulcanization accelerator blended with respect to 100 parts by weight of a rubber component formed of one of polyisoprene rubber, natural rubber, polybutadiene rubber or a mixture thereof, said rubber component has a cis-1,4 bond content of from 90.0% to 93.8%, and said rubber component has a trans-1,4 bond content of from 2.0% to 5.0%, and the blended amount of said sulfur is made greater than the blended amount of said vulcanization accelerator.

5. The thread rubber for a golf ball according to claim 4, wherein the sheet of said thread rubber composition has a ratio (t/T) of a thickness (t) of thin sheet material after the calendering step with respect to a thickness (T) of a sheet after the extrusion step of from 0.03 to 0.5.

6. The thread rubber for a golf ball according to claim 5, wherein the thickness of the thin sheet material after the calendering step of said thread rubber composition is 0.5±0.1 mm with a standard deviation σ of not greater than 0.02.

7. The thread rubber for a golf ball according to claim 4, wherein a ratio of the vulcanization accelerator to the sulfur is less than 1.0.

8. The thread rubber for a golf ball according to claim 4, wherein a ratio of the vulcanization accelerator to the sulfur is more than 0.4 and less than 1.0.

9. A golf ball manufactured by winding a thread rubber around a center and further enveloping the center with a cover, the thread rubber being produced by shaping a thread rubber composition into a sheet, vulcanizing the sheet to obtain a vulcanized sheet, and cutting the vulcanized sheet into threads, wherein said thread rubber composition has 0.5–7.0 parts by weight of sulfur and 0.5–5.0 parts by weight of vulcanization accelerator blended with respect to 100 parts by weight of a rubber component formed of one of polyisoprene rubber, natural rubber, polybutadiene rubber or a mixture thereof, said rubber component has a cis-1,4 bond content of from 90.0% to 93.8%, and said rubber component has a trans-1,4 bond content of from 2.0% to 5.0%, and the blended amount of said sulfur is made greater than the blended amount of said vulcanization accelerator.

10. The golf ball according to claim 9, wherein a ratio of the vulcanization accelerator to the sulfur is less than 1.0.

11. The golf ball according to claim 9, wherein a ratio of the vulcanization accelerator to the sulfur is more than 0.4 and less than 1.0.

* * * * *